United States Patent Office 3,014,776
Patented Dec. 26, 1961

3,014,776
LOW TEMPERATURE DYEING OF ACRYLIC POLYMERS
Jerry M. Mecco, Somerville, N.J., assignor to American Cyanamid Company, New York, N.Y., a corporation of Maine
No Drawing. Filed June 23, 1959, Ser. No. 822,195
13 Claims. (Cl. 8—55)

The present invention relates broadly to improvements in coloring hydrophobic, synthetic, basic polymeric "acrylic" products making use of available dyestuffs which previously could not be utilized successfully. More particularly, it is concerned with coloring basic "acrylic" copolymers comprising polymerized acrylonitrile and at least one polymerized "basic" comonomer and containing at least seventy percent by weight of acrylonitrile.

Still more specifically, it also presents a novel method whereby such basic acrylic copolymers may be colored with conventional dyestuffs at lower temperatures, in shorter times and with less physical disturbance of the fiber than previously possible. The invention also contemplates novel compositions for use therein.

Despite the minimized fiber disturbance, the invention accomplishes its desired results by producing a modified fiber. The invention therefore also contemplates such modified fibers per se.

As now presented, the instant application constitutes a continuation-in-part of my copending application for United States Letters Patent, Serial No. 284,667 filed September 27, 1951.

While the present invention may be used to treat the hydrophobic, basic, copolymeric materials in various physical forms, as for example in sheets, films, rods, tubes, etc., probably its most useful application is in dyeing and printing of fibers, yarns and fabrics. Therefore, these forms will be taken as illustrative herein.

In recent years, industry has developed a large number of varied synthetic fibers, each having desirable properties. Many are copolymers of acrylonitrile. Illustrative examples include copolymers of acrylonitrile and vinyl chloride such as those sold under the trade name "Dynel"; polyacrylonitrile polymers and copolymers which are dryspun from anhydrous solvents and sold under the trade name "Orlon"; copolymers of acrylonitrile and vinyl pyridine and of acrylonitrile, vinyl acetate and vinyl pyridine such as are sold under the trade name "Acrilan"; acrylonitrile fibers wet spun from concentrated aqueous thiocyanate solution such as sold under the trade name "Creslan"; and many others.

Despite the varied, but advantageous, properties of these new fibers, they have one characteristic in common. They are all hydrophobic in character and difficult to dye with many of the usual types of commercially available dyestuffs, particularly to uniform deep shades. As a result, in the past, many fabrics made therefrom have been available only in pastel shades. This has seriously limited their fields of utility.

This problem has proved particularly troublesome with respect to the acrylonitrile copolymers of this invention. As noted above, the latter is concerned only with certain acrylic copolymers, i.e., those "basic" copolymers which comprise at least 70% by weight of polymerized acrylonitrile and also contain at least one copolymerized "basic" comonomer. This will be developed more fully below.

In the following discussion, the term "acrylic fibers" is used to denote only such basic copolymers. Yarns and fabrics, however, are included within the scope of the term as used. Homopolymeric acrylonitrile as well as copolymers which do not contain the basic comonomer are outside the intended scope of this invention and of the term as used herein.

As the use of these various hydrophobic, synthetic fibers, both those within the scope of the invention and those which are not, were being industrially developed, the available commercial dyestuffs could be roughly classified into the following two groups:

(a) These dyes in which the color is imparted by the positively-charged portion of the molecule, as for example the so-called "basic" dyes; and
(b) Those in which it is imparted by the negatively-charged portion of the molecule. These may be represented, for example, by the acid dyes, many direct dyes, vat dyes, sulfur dyes, naphthol dyes, metalized and metalizable dyes, and the like, as well known in the art.

Although the acrylic fibers of the present invention are nitrogen-bearing, they are not amenable to dyeing with such dyes by conventional methods which have been successful with such "natural" nitrogen-bearing fibers as silk or wool.

Prior to my invention it was not possible to accomplish satisfactory dyeing of those acrylic fibers by using known dyes in conventional procedures. As to the latter, "acid" dyes, for example, are applied from acidic solutions. In general these solutions are strongly acidic, although some "milling" dyes and some "direct" dyes may be applied from baths having only a slightly acidic pH. In general, "vat" dyes are applied only from definitely alkaline solutions, with the exception of some so-called "soluble-vats" or "acid-vats." "Basic" dyes are applied from baths having only a slightly alkaline pH. "Dispersed" (acetate) dyes may be dyed from substantially neutral solution. The use of such dyes and dye baths, and others, in conventional procedures is well known in the art.

When it is attempted to apply such dyes by these known methods to the acrylic fibers of this invention, some dyeing is usually obtained. However, as compared with color values obtained with the same dye on the conventional fibers for which the particular procedure is intended, the result is very poor. It is so much weaker as to be commercially unacceptable. A wholly-satisfactory, simple process for applying even one class of dyestuffs to acrylic fibers had not been found at the time my above-noted original application was filed.

In considering the scope of the present invention it should be noted that the manufacture per se of the untreated acrylic fibers is not part thereof. As was briefly noted above, they are copolymers produced by copolymerization of copolymerizable ingredients, acrylonitrile being the major ingredient. They must include a lesser amount of at least one basic, nitrogen-containing monomer. Usually the basic comonomer content comprises from about 0.5% to about 30% by weight of the whole copolymer. Copolymerization may have been accomplished by any known method. These include the formation of those acrylonitrile polymerization products in which the basic monomer is first polymerized, at least in part, separately from the acrylonitrile and then has been dispersed throughout the acrylonitrile polymerization product.

Prior to my invention, as briefly noted above, acrylic fibers could not be dyed with conventional dyes by conventional methods to obtain commercially-satisfactory dyeings. As a result, various procedures have been proposed, and many compounds have been tested, in efforts to improve dyeability. Only a few have achieved any degree of success. Even these are not generally useful.

For example, copolymers in which the basic monomer was at least partially polymerized before incorporation with the acrylonitrile were noted above. Such copolymers were developed primarily because when compared with homopolymeric acrylonitrile, or with copolymers of acrylonitrile in which a comonomer other than a basic comonomer has been used, they exhibit somewhat greater dye receptivity to acid dyes. Actually, even with acid dyes, although improvements were obtained, the color values obtainable still were not as high as the trade desires. Uniform, deep, level shades were not obtainable.

Increasing the content of basic comonomer might seem to offer a solution to this problem. However, it is not economically feasible to add more than about 40%. Moreover, above about 30% any increase in susceptibility to dyeing with acid dyes does not justify the added cost. Moreover, the presence of these added basic nitrogen atoms does not render the product more amenable to dyeing with other classes of available dyestuffs.

With various other proposals, in some cases, some limited improvement may be obtained by special pretreatments, using special dyeing assistants or by dyeing under pressure at temperatures above the atmospheric boiling point. Again, however, the results are not generally satisfactory. Such treatments proved too limited in scope to be generally useful. In particular, using drastic treating temperatures resulted in undesirable disturbance of the fiber. Finally, color values obtained were still generally too low.

Therefore, prior to this invention, there still remained a need for a treatment for acrylic fibers which could overcome these drawbacks, yet be easily carried out. Such treatment should enable satisfactorily level dyeing to the desired deep shades, using conventional dyes and methods. It should not result in excessive disturbance of the fiber. It should produce a modified fiber that is susceptible to uniform, level dyeing to deep shades without otherwise changing the desired physical characteristics. It should enable dyeing to be accomplished more quickly, more easily and preferably under less drastic conditions. It should not require special apparatus or hazardous materials.

Surprisingly, in view of the need for such a treatment and modified fiber, and the previous lack of success, according to this invention it has been found. It is a particular and most unexpected result that the desired modification is quite general in application. Resultant modified fibers may be dyed to uniform, level deep shades using almost any desired type of dyestuff of the types listed above without requiring special apparatus or wide variation from the normal technique of using the selected dyestuff. Moreover, if so desired, successful dyeings may be carried out, even in a few minutes, at temperatures below 150° F.

In general, the treatment and the resultant modified fibers or fabrics of the present invention may be simply described. The acrylic fibers are subjected to a fiber-modifying bath. This produces the desired increased susceptibility to dyeing. Any class of dyes may be used. It is a further advantage that this bath is aqueous and not subject to the disadvantages of an organic solvent system required by some previous proposals. It is a further advantage of the invention that while the fiber is chemically modified, its desired physical characteristics are not altered.

The modifying bath must be acidic. This is essential. In addition, it must contain the correct amount of an anionic-type, surface-active agent. If so desired, it may contain also as an electrolyte a simple water-soluble inorganic salt or a mixture of such salts. Treatment must be carried out at a suitable temperature.

A further advantage is that the acrylic fibers may be either pretreated with the fiber-modifying bath, or when dyes normally requiring an acid bath for their application are used, the modifying treatment may be combined with dyeing. The former permits using existing dyeing procedures in plant operation. The latter produces a faster overall process. Herein pretreatment will be more fully discussed first. Thereafter, the combined technique will be demonstrated.

When pretreatment is used, treated fiber may be passed directly to the dyeing operation, preferably, but not necessarily, after an intervening wash with warm water. However, if so desired, pretreated material, usually, as noted, after washing, may be dried, usually at from about room temperature to about 180° F. It is a further advantage of this invention that the fiber modification persists, even when pretreatment includes not only washing but also scouring, drying and subsequent storage. Dried modified fibers may be dyed, according to the dye chosen, using the normal technique for that type of dye.

Although pretreating has been briefly outlined, the apparent simplicity, as so stated, is more apparent than real. Definite limitations must be met for each feature. However, within the limitations for any one item a choice may be made over a fairly wide range. The essential limitations may be listed as follows:

(1) The nature of the fiber.
(2) The acidity of the treating solution.
(3) The amount of solution to be used.
(4) The choice of anionic surfactant.
(5) The amount of surfactant.
(6) The temperature and time of treatment.

The first has been discussed briefly. There must be a definite content of at least one polymerized, basic, nitrogen-containing comonomer; usually some 0.5 to about 30% of the total weight. These latter include copolymerizable monomers characterized by containing at least one $H_2C=C<$ group and at least one carbon-nitrogen-carbon linkage such as found in pyridine. Typical examples are monomers which have been used which include; vinyl pyridines such as vinyl pyridine, methylvinylpyridine and the like. This will be more fully developed below. There also may be present as modifiers other polymerized monomers. They are not essential to this invention even though some may contain the $CH_2=C<$ group. This too will be amplified below.

Of the many such industrially-available copolymers thus far encountered by applicant, all have successfully yielded to treatment according to this invention.

Secondly, the treating bath must be acidic. It must have a pH below 6.0. It may be as low as about 0.1 or less. In general, a range from about pH 1 to about pH 4.5 will be found satisfactory. The requisite degree of acidity can be maintained with any available acid which does not decompose or ionize to products which alter the color of the fiber or adversely affect the dye in a combined modifying and coloring operation. In most cases, sulfuric acid will be preferred for economy and simplicity. Other mineral acids which can be used include nitric, hydrochloric and phosphoric. Various organic acids have been used including formic, acetic, propionic, butyric, valeric, caproic, heptylic, acrylic, oxalic, malonic, succinic, glutaric, salicylic, citric, lactic, phthalic, benzenesulfonic, o-, m- and p-toluenesulfonic acids, available anhydrides of the aforementioned acids, e.g., acetic anhydride, etc., as well as others.

The volume of treating bath should be ample to thoroughly wet the acrylic fibers to be treated and/or dyed. In general, the minimum weight ratio of bath to fibers will be about ten:one. There is no critical upper limit since the total will depend on the weight of fibers being processed. The ratio may be as high as 300:1 or more. In general, however, it will range from about 10:1 to about 150:1.

Any commercially available anionic-type of wetting agent may be used. Typical examples include sulfated and sulfonated higher fatty acids and fatty acid glycerides such as oleic, stearic, hydroxystearic, caster oil, and the like, as well as their alkali metal and amine salts and amides; alkali metal salts of sulfated and sulfonated alcohols such as sodium dodecyl sulfate, sodium lauryl sulfonate and the like; alkyl sulfosuccinate and the salts such as dioctyl sodium sulfonate, di-isobutyl sodium sulfosuccinate, disodium mono (7-ethyl-2-methylundecyl-7) sulfosuccinate and the like; alkyl aryl sulfonates such as keryl benzene sodium sulfonate and the like; and many others well known in the art.

A more critical factor than the solution volume is the weight ratio of anionic surfactant to fibers. For the volume used, there must be a minimum of about 0.1% by weight of the fibers, even at the end of the treatment. There is no particular upper limit. In some cases 100% of the weight of the fibers, or even more, may be used if so desired. In general it will not usually exceed about 20%, above which no practical advantage seems to be obtained.

The treating solution may be applied to the acrylic fibers by any suitable means. Ordinarily it is applied merely by immersing the fibers in a bath of treating solution for a period sufficiently long to obtain the desired result. This in time is related to the temperature of the treating bath. The latter can be as low as room temperature (60°–75° F.) if time is not a factor in effecting the desired results. From a practical standpoint, it is usually desirable to maintain the treating bath at an elevated temperature above about 95° F. Generally the solution temperature while in contact with the acrylic fibers product is within the range of from about 120° F., to about the atmospheric boiling point. If so desired, temperatures up to about 250° F., may be used if effected at superatmospheric pressure. However, temperatures above the boil produce excessive fiber disturbance. The necessary time will usually range from about 8 to 10 hours at about room temperature to as little as about ten to fifteen minutes at about the boiling point.

No added electrolyte is essential in the pretreatment. However, it may be useful both when modification is combined with dyeing and in subsequent dyeing of pretreated fibers. If one is used, it will usually be a simple salt such as sodium chloride. In some locations, known water-softening salts may be useful. Other electrolytes which may be used therefore include such simple salts as the water-soluble alkali sulfates and phosphates.

As discussed above, pretreating may be prior to or concomitantly with the color deposition. In both of these operations the acidic pH must be maintained. This should not be confused with the case where the premodified fiber is subsequently being dyed. In this latter procedure, the dye bath may have any pH required by the conventional dyeing procedure being used.

The invention will be more fully described in conjunction with the following examples which are intended as illustrative. Unless otherwise noted all parts and percentages are by weight; concentration percentages are based on the weight of the fiber to be treated; and temperatures are indicated in degrees Fahrenheit. As used for purposes of simplification in the examples, the fiber designations A, B, C and D have the following meanings:

*Fiber A* is a commercially-available acrylic fiber containing about 85% acrylonitrile and about 7.5% each of vinyl acetate and monovinylpyridine.

*Fiber B* is a commercially-available acrylic fiber containing about 95% acrylonitrile and about 5% monovinylpyridine.

*Fiber C* is a commercially-available acrylic fiber containing about 88.7% acrylonitrile, 6.3% methylvinylpyridine and 5% vinyl acetate.

*Fiber D* is an acrylic fiber commercially available under the trade name "Darvan."

The first series of examples show the poor results obtained by standard procedures. Indicated color strengths were determined using a General Electric recording spectrophotometer.

EXAMPLE 1

Aqueous 300 ml. dyebaths are prepared using in each, as a typical metalizable dye, 2% of Chromable Blue BBG (C.I. 43,830) and 2% aqueous acetic acid (28%). Into each bath, one 5 g. skein of yarn is entered at room temperature and the bath is brought to the boil and maintained for one half hour. Yarns of fibers A and C are used. Thereafter, there is added 1% potassium bichromate and an additional 2% acetic acid, and boiling is continued an additional half hour. Then 2% sulfuric acid is added and the boiling continued an additional half-hour. Skeins are then rinsed with water and air dried. Pale blue dyeings are obtained.

EXAMPLE 2

As an example of a typical direct dye, 300 ml. aqueous dyebaths are prepared containing 1% Yellow 4 GL (C.I. 25,300) and 30% sodium chloride. Into each is entered at room temperature a 5 g. skein of yarn, fibers A, B, C and D are used. The bath is raised to the boil, boiled for three quarters of an hour, rinsed and dried. Very light yellow dyeings are obtained.

EXAMPLE 3

As an example of the use of a typical premetalized dye, a metalized (chromium) blue wool dye (C.I. 14,880) is used to prepare 300 ml. dye baths containing 2% dye and 8% sulfuric acid. After entering 5 g. skeins of the yarns of Example 2, one in each bath, into each at room temperature, the bath is brought to the boil and boiling is continued for one and one-half hours, resultant dyed skeins being rinsed and dried. Pale-greenish-blue dyeings are obtained.

EXAMPLE 4

As an example of the dispersed (acetate) dyes, 300 ml. dye baths are prepared using only water and 100 mg. of Acetate Sapphire Blue B (C.I. 61,505). Skeins (5 g.) of the same yarns as in Example 1 are entered cold one in each bath, and the bath is slowly brought to the boil and boiling is continued for about one hour. Pale blue dyeing results.

EXAMPLE 5

As an example of the use of a basic dye, 300 ml. aqueous dye baths are prepared containing 0.2% of Rhodamine BX (C.I. 45,170). Skeins (5 g.) of the yarns of Example 1 are entered, one skein in each bath, and held at room temperature for about 20 minutes, then slowly raised to about 90° C., and held for about 20 minutes and finally allowed to cool for about 20 minutes, rinsed and dried. Substantially no dye is deposited.

EXAMPLE 6

To illustrate the use of a typical vat dye, 300 ml. baths are made up using 3% Vat Jade Green (C.I. 59,825) and water containing one ounce per gallon each of sodium hydroxide and sodium hydrosulfite. Dyeings of the same fibers as in Example 1 are made at the boil for one hour with reducing conditions being maintained by adding sodium hydrosulfide as necessary as shown by Vat Yellow G (C.I. 70,600) test paper. Dyed yarn is oxidized in air for five minutes, then for five minutes at 140° F., in an aqueous solution of 0.1% each of acetic acid and hydrogen peroxide. Thereafter, the yarn is soaped at the boil (0.1% aqueous solution) for five minutes, rinsed and air dried. Pale, light green dyeing is obtained.

EXAMPLE 7

Example 6 is repeated substituting for the dye 3% of Vat Yellow GC (C.I. 67,300). Only light yellow dyeing is obtained.

EXAMPLE 8

Example 7 is repeated with the exception that 3% of Vat Blue BLD (C.I. 69,825) is used and the bath also contains sodium nitrite (0.25 oz./gal.). Light pale blue dyeings are obtained.

EXAMPLE 9

Aqueous dyebaths are prepared comprising for each, as a typical acid dye, 50 mg. of Acid Phloxine 2G (C.I. 18,050) 150 mg. sulfuric acid (real) and sufficient water to obtain 300 ml. Five-gram skeins of the yarn of fiber B and fiber C are entered into the dye baths (one skein in each bath) at room temperature, slowly brought to the boil and boiling continued for about one half hour, the dyed skeins being rinsed and dried. Resultant red dyeings are very pale and weak.

EXAMPLE 10

As an illustration of the fiber modification obtained in the practice of the present invention, a treating bath was prepared containing per liter 10% of sodium dodecyl sulfate and 5% of 1.42 sp. gr. nitric acid. 110 g. (22 5 g.-skeins) of yarns of fibers A, B, and C entered in one liter of the treating bath at room temperature, slowly heated to and held at about 90° C. for about one half-hour, rinsed and dried.

EXAMPLE 11

Examples 1-8 are repeated on skeins treated according to Example 10. Using the color value obtained in those examples as 100%, dyeing strengths several times stronger were obtained. The result obtained in dyeing skeins treated according to Example 10 in the dyeing procedure of Example 5 is particularly striking. Whereas dyeing in Example 5 is too weak to be accurately evaluated by the spectrophotometer, strong, brilliant, fluorescent red dyeings were obtained. Other results are shown in the following Table I.

Table I

| Procedure of— | Untreated, percent | Treated, Ex. 10, percent |
| --- | --- | --- |
| Example 1 | 100 | 225 |
| Example 2 | 100 | 390 |
| Example 3 | 100 | 290 |
| Example 4 | 100 | 240 |
| Example 6 | 100 | 290 |
| Example 7 | 100 | 320 |
| Example 8 | 100 | 400 |

EXAMPLE 12

Example 9 was repeated using skeins treated according to Example 10. Much stronger red dyeings are obtained.

EXAMPLE 13

As a further illustration of the fiber modification of the present invention, a treating bath is prepared containing per liter, 25 ml. of 36% aqueous hydrochloric acid and 5 g. each of sodium sulfate, and sodium dodecyl sulfate. 100 g./liter of fiber A yarn (as 5 g. skeins) is treated therewith as in Example 10, being entered at room temperature, raised to the boil, held for about 15 minutes, rinsed and dried.

EXAMPLE 14

Example 11 was repeated on skeins treated according to Example 13. In each case dyeings, somewhat stronger and brighter than corresponding dyeings in Example 11 were obtained.

EXAMPLE 15

To illustrate the using of milling type dyes, 300 ml. dye baths were prepared containing 1% Milling Green 6B (C.I. 42,100) and 5% acetic acid, based on the fiber weight. Dyeing is carried out at the boil for about one hour, on untreated skeins and skeins treated according to Examples 10 and 13. Untreated skeins are substantially undyed, showing only a pale green tint. Skeins treated according to Example 10 are dyed a strong bright shade. Skeins treated according to Example 13 are dyed somewhat stronger shades.

EXAMPLE 16

Example 15 is repeated substituting 20% Glauber's salt for the acetic acid. Substantially the same results are obtained.

EXAMPLE 17

A further illustrative fiber-modifying bath is prepared containing per liter, 5.5 g. sulfuric acid (real) and 11 g. of Aerosol OT, 110 gm. (as 5 g. skeins) of fiber A yarn per liter of bath are entered at room temperature, raised to the boil, held for about 30 minutes, rinsed and dried. The dyeing procedure and dye of Example 5 is repeated on treated and untreated skeins. Substantially no dyeings of untreated fibers but strong fluorescent dyeings of the treated fibers is obtained.

EXAMPLE 18

The dyeing procedure and dye of Example 15 is repeated on untreated skeins and on skeins treated according to Example 17. Again, the untreated fibers are only slightly tinted, the treated fibers are strongly dyed.

EXAMPLE 19

In order to illustrate the use of the present invention in printing, fabrics made from the yarns of fibers A and C were pretreated using the treating solution and method of Example 17. A printing composition is prepared from 7.5 parts of stabilized commercial color (insoluble azo) prepared from Naphthol AS-G and Fast Red KB base and 92.5 parts of Rapidogen Print Green (Arnold-Hoffman). Treated and untreated pieces are printed, acid-aged in acetic acid fumes in steam, rinsed in water, soaped at 160° F. for five minutes with an aqueous (0.1%) soap solution, rinsed and dried. Prints on untreated pieces are low in color value, those on treated pieces being much brighter and stronger.

EXAMPLE 20

Prints are made on treated and untreated fabrics of Example 19, using the basic dye Acridine Orange (C.I. 46,005) and the conventional procedure. Prints on the treated pieces are much stronger than on the untreated pieces.

As was discussed above, it is essential that nitrogen atoms be added by means of the basic comonomers to the copolymeric acrylic fibers. However, their presence alone is not productive of wholly successful dyeing even with acidic dyes. Increasing the content of such nitrogen atoms by adding more of such a comonomer is not economically practicable nor will it solve the problem of obtaining deeper color shades. Such nitrogen atoms are electrostatically neutral. They do not act as sites for the colored portion of ionized dyes which are also electrostatically neutral.

While it is not intended to limit the present invention to any particular theory of operation, the fiber definitely is modified by the treatment. The characteristic carbon-nitrogen-carbon linkages of the untreated fiber disappears during treatment. It is thought that one of the effects of the treatment is to cause the nitrogen atom to take on an additional charge so that it is no longer electrostatically neutral. Whatever the mechanism of the alteration that the fiber is modified is shown in the following examples.

EXAMPLE 21

An untreated sample of yarn of fiber A was subjected to infra-red spectrographical examination, using standard known techniques. A second sample of the same yarn was scoured for 15 minutes at 120° F., using an aqueous solution containing 3% soap and 1% sodium carbonate, rinsed, squeezed and dried. A sample of the scoured yarn was also subjected to the same investigation. Each sample showed the infra-red absorptions characteristic of a pyridine ring structure. Neither showed the presence of any significant amount of

groupings.

EXAMPLE 22

A treating bath was prepared comprising 300 parts of water and 7.5 parts of 36% aqueous HCl. Three skeins (5 parts each) of yarn of fiber A are added at room temperature, thoroughly wet, and the solution then slowly raised to the boil and held for 15 minutes, the skeins being turned intermittently. Thereafter the skeins are removed and treated as follows:

Skein 1 is squeezed and dried.

Skein 2 is washed with warm running water, squeezed and dried.

Skein 3 is washed (like 2), scoured for 15 minutes at 120° F., with a solution containing 3% soap, and 1% sodium carbonate, again washed with warm water, squeezed and dried.

Each skein is subjected to infra-red examination as in Example 21. Each shows the same infra-red absorption characteristic of a pyridine ring structure as did both control samples of Example 21.

EXAMPLE 23

Repeating Example 22, substituting 3.63 parts of 98% sulfuric acid produces the same result, the yarns show the same characteristic carbon-nitrogen-carbon linkages absorption characteristics.

EXAMPLE 24

Repeating Example 22, but adding to the treating bath 1.5 parts of a commercially-purchased anionic surfactant (containing 0.75 part each of sodium dodecyl sulfate and sodium sulfate) produces a different set of results. Each sample shows no absorption characteristics of a pyridine ring. Each does show absorption characteristics of a different carbon-nitrogen-carbon linkage. They correspond to those which is known to be produced by a pyridinium ion.

EXAMPLE 25

Example 23 is repeated, adding the anionic agent of Example 24. The treated samples show the same characteristics as found in those in Example 24.

EXAMPLE 26

Example 24 is repeated omitting the acid from the treating bath. Treated samples again showed the same absorption characteristics as found in Examples 21 and 22.

From the foregoing examples, and others using varied amounts of acid and varied anionic agents, it has been found that both acid and anionic agent are necessary to produce the fiber-modification and that without the modification, conventional methods and conventional dyes do not produce successful dyeings.

As was noted above, a particular advantage of the present invention is that the fiber modifying operation may be carried simultaneously with the dyeing. Excellent dyeings can be obtained in as little as thirty minutes at temperatures not exceeding 140–145° F.

When fiber modification and dyeing are combined into one operation in order to accomplish low temperature dyeing, a dyeing assistant is provided. For this purpose it is preferred to use a liquid lower-alkyl ester of a carbocyclic aromatic carboxylic acid. Preferably it should not contain more than two carbocyclic rings. Methyl salicylate is the material of choice in most cases. Other useful examples include methyl benzoate, isopropyl benzoate, methoxyethyl benzoate, methyl 2-chlorobenzoate, methyl p-tertiary-butyl benzoate and amyl benzoate. However, certain solid esters may be employed if so desired. They should be first fluidized by dissolution. The following esters are illustrations of such usable solid esters methyl ester of 3-hydroxy-2-naphthoic acid, methyl p-nitro-benzoate, methyl p-hydroxybenzoate, methyl 2,4-dihydroxy-benzoate, methyl 3,4-dichlorobenzoate, methyl p-aminobenzoate, methyl 3,4,5-trimethoxybenzoate, methyl trimethylgallate, methyl p-phenylbenzoate, methyl o-benzoylbenzoate.

Preferably the anionic agent and the ester will be added to the solution in the form of an emulsion. Such emulsions and their preparation, although for another purpose, are shown in U.S. 2,881,045 in which I was a coinventor. These are stable, aqueous emulsions in which water and the anionic agent comprise the outer phase and the internal phase comprises the dyeing assistant. As noted above, the latter are either liquid per se or are liquified by dissolving the ester in a small amount of water-insoluble organic solvent. This is shown by the following example.

EXAMPLE 27

A dye solution is prepared by dissolving one gram of Acid Red 182 in 100 ml. of boiling water and diluting the resultant solution to about 500 ml. A dye bath is prepared from 25 ml. of this dye solution being added to 169 parts of water to which is added 3 ml. of 2.8% aqueous sulfuric acid, 0.5 g. of sodium chloride and 3 ml. of a prepared emulsion containing in the external (aqueous) phase 0.15 g. of Aerosol OT as the anionic agent and in the internal phase 1.5 g. of methyl salicylate and the whole is diluted with water to 200 ml.

A 5 g. skein of yarn of fiber C is entered into each bath in the cold and the bath slowly raised to about 140° F., and held for about one half hour. Dyed skeins are removed, rinsed, scoured at 140° F. with 1% soap solution for about 5 minutes, rinsed and air dried. Good even red dyeings result at this temperature.

EXAMPLE 28

Repeating the procedure of Example 27 but omitting the acid produces no useful dyeing.

EXAMPLE 29

Repeating the procedure of Example 27 omitting the methyl salicylate emulsion produces no useful dyeing.

EXAMPLE 30

Repeating the procedure of Example 29 but increasing the temperature to 160° F., to 190° F., and to the boil still did not produce useful dyeing.

EXAMPLE 31

The procedure of Example 27 is repeated except the Acid Blue No. 165 is used instead of the Acid Red 182. A level blue dyeing is obtained after fifteen minutes.

EXAMPLE 32

Example 27 is repeated except that Acid Orange No. 64 is substituted for the Acid Red No. 182 and methyl benzoate is used as the dyeing assistant. Good level orange shades are obtained.

EXAMPLE 33

The procedures of Examples 1, 3 and 9 are repeated except that 3 ml. of the methyl salicylate emulsion of Example 27 is added to the dye bath in each procedure. Good level dyeings are obtained which compare favorably with those obtained in Example 11.

Skeins (5 g.) of yarn pretreated in Example 17 were dyed according to the procedure of Examples 1, 3 and 9 except that the dye bath temperature was held at 140–150° F., and dyeing was carried out for 15 minutes at that temperature range. Good level color values substantially equal to those obtained in Example 33 are obtained.

As was noted above, the acrylic fibers of this invention must contain from about 0.5 to about 30% by weight of a copolymerized basic comonomer. In general it was noted also that such comonomer can be characterized as containing at least one H₂C=C< grouping and at least one nitrogen in a carbon-nitrogen-carbon linkage such as found in the pyridine ring. A typical example would be a vinyl pyridine such as 2-vinyl pyridine and its isomers. The vinyl pyridine ring may also be further substituted as for example those which can be represented by the formula

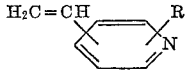

wherein R represents a lower alkyl radical, e.g., methyl, ethyl, propyl, isopropyl, butyl, sec.-butyl, tert.-butyl, amyl, isoamyl, etc. More specific examples of monovinylpyridines embraced by the formula are 5-ethyl-2-vinylpyridine, 6-methyl-2-vinylpyridine and 4-ethyl-2-vinylpyridine. Other examples of monovinylpyridines that can be used are 4,6-dimethyl-2-vinylpyridine and the 2- and 4-vinylquinolines.

As was also noted above, other non-nitrogen-bearing comonomers may be present as modifiers of the fiber structure and properties. Their presence or absence in the acrylic fibers of this invention forms no part of the latter. Such modifying monomers may vary widely. They may include for example vinyl compounds which are different from acrylonitrile (vinyl cyanide), including the vinyl aromatic compounds, more particularly the vinyl aromatic hydrocarbons such as styrene, isopropenyl toluene, the various dialkyl styrenes, and the like; other aliphatic compounds containing a CH₂=C< grouping, such as various substituted acrylonitriles (e.g., methacrylonitrile, ethacrylonitrile, phenylacrylonitrile, etc.), vinyl esters, e.g., vinyl acetate, vinyl propionate, vinyl butyrate, vinyl isobutyrate, vinyl valerate, vinyl acrylate, vinyl methacrylate, and the like; esters of an acrylic acid (including acrylic acid itself and the various alpha-substituted acrylic acids, e.g., methacrylic acid, ethacrylic acid, phenylacrylic acid, etc.); more particularly the alkyl esters of an acrylic acid, e.g., the methyl, ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc.; acids including the alkyl acrylates containing not more than four carbon atoms in the alkyl grouping, such as those listed above; as well as other vinyl aromatic and vinyl aliphatic compounds, and other compounds containing a CH₂=C< grouping.

I claim:

1. A modified acrylonitrile copolymer product containing (a) at least 70% by weight of polymerized acrylonitrile and (b) from about 0.5 to about 30% by weight of at least one copolymerized basic nitrogen containing comonomer, said comonomer before polymerization containing at least one H₂C=C= grouping and both said comonomer and said unmodified copolymer product containing at least one electrostatically neutral nitrogen atom such as occurs in pyridine; said modified copolymer product being physically substantially unchanged but differing from the corresponding unmodified copolymer product in being (a) substantially free of said electrostatically neutral nitrogen atoms, and (b) further characterized by being capable of being readily dyed by conventional dyestuffs in conventional dyeing procedures.

2. A modified acrylonitrile copolymer fiber containing (a) at least 70% by weight of polymerized acrylonitrile and (b) from about 0.5 to about 30% by weight of at least one copolymerized basic nitrogen containing comonomer, said comonomer, before polymerization, having the structural formula

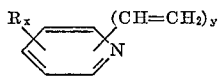

wherein R is a lower alkyl radical, x is selected from 0, 1 and 2 and y is selected from 1 and 2 and said unmodified copolymer product containing at least one electrostatically neutral nitrogen atom such as occurs in pyridine; said modified copolymer product being physically substantially unchanged but differing from the corresponding unmodified copolymer product in being (a) substantially free of said electrostatically neutral nitrogen atoms, and (b) further characterized by being capable of being readily dyed by conventional dyestuffs in conventional dyeing procedures.

3. A method of producing a modified acrylonitrile copolymer fiber which exhibits substantially no physical change from the corresponding unmodified fiber, said fiber containing (a) at least 70% by weight of polymerized acrylonitrile and (b) from about 0.5 to about 30% by weight of at least one copolymerized basic nitrogen containing comonomer, said comonomer before polymerization containing at least one H₂C=C= grouping and both said comonomer and said copolymer fiber before treatment being characterized by the presence of at least one electrostatically neutral nitrogen atom such as occurs in pyridine and as is determinable by infrared spectroscopy, said method comprising; treating said unmodified copolymer product at temperatures in the range from about 65° F. to about the boiling point at atmospheric pressure, in from about 10 to about 300 parts by weight per part of copolymer fibers of an aqueous acidic bath containing (a) an acid content not less than that at pH 6 at all times and (b) at least 0.1 part by weight per part of copolymer fibers of an anionic-type surface-active agent, and said bath being free from hypohalide-type bleaching agents; and continuing said treatment for a period of time ranging from about 10 hours at said 65° F. to about 10 minutes at said boiling point, whereby said treated fibers undergo substantially no physical disturbance but become (a) substantially free of said electrostatically neutral nitrogen atoms as determinable by infrared spectroscopy, and (b) susceptible to being readily dyed with conventional dyes by conventional dyeing methods.

4. A method according to claim 3 in which said acid is selected from the group consisting of sulfuric, hydrochloric, nitric, formic and acetic acids.

5. A low temperature method of producing a modified and dyed acrylonitrile copolymer fiber containing (a) at least 70% by weight of polymerized acrylonitrile and (b) from about 0.5 to about 30% by weight of at least one copolymerized basic nitrogen containing comonomer, said copolymer before treatment being characterized by the presence of electrostatically neutral nitrogen atoms such as occur in pyridine and as are determinable by infrared spectroscopy, said method comprising: treating said copolymer, at temperatures in the range from about 65° F. to about the boiling point at atmospheric pressure, in from about 10 to about 300 parts by weight per part of copolymer fibers of an aqueous acidic bath containing (1) an acid content not less than that at pH 6 at all times, and (2) at least 0.1 part by weight per part of copolymer fibers of an anionic-type surface-active agent, and said bath being free from hypohalide-type bleaching agents; and continuing said treatment for a period ranging from about 10 hours at said 65° F. to about 10 minutes at said boiling point, whereby said fibers undergo substantially no physical disturbance but become substantially free of said electrostatically neutral nitrogen atoms; forming an acid dye bath of any conventional dyestuff capable of being dyed from an acidic medium, adding to said dye bath from about 2 to about 50 parts by weight per part of said anionic surface-active agent of a dyeing assistant, said assistant comprising a lower alkyl ester of a carbocyclic aromatic carboxylic acid having not more than two carbocyclic rings, and subjecting the treated fibers to the action of resultant dye bath at temperatures in the range from about ambient temperature to about 150° F.

6. A procedure according to claim 5 in which said treating bath and said dye bath are combined in a single aqueous treating bath and the resultant single treating bath temperature is maintained below a maximum of about 150° F.

7. A process according to claim 5 in which said dyeing assistant is methylsalicylate.

8. A process according to claim 5 in which said dyeing assistant is a lower alkyl benzoate.

9. A process according to claim 6 in which said dyeing assistant is methylsalicylate.

10. A process according to claim 6 in which said dyeing assistant is a lower alkyl benzoate.

11. A modified acrylonitrile copolymer product produced according to the process of claim 3.

12. A colored modified acrylonitrile copolymer fiber produced according to the process of claim 5.

13. A colored modified acrylonitrile copolymer fiber produced according to the process of claim 6.

References Cited in the file of this patent

UNITED STATES PATENTS

| | | |
|---|---|---|
| 2,253,368 | Dubeau | Aug. 19, 1941 |
| 2,260,367 | Dubeau | Oct. 28, 1941 |
| 2,420,336 | Orchard | May 13, 1947 |
| 2,432,447 | Scheiderbauer | Dec. 9, 1947 |
| 2,628,152 | Meunier | Feb. 10, 1953 |
| 2,637,620 | Ham | May 5, 1953 |

FOREIGN PATENTS

| | | |
|---|---|---|
| 905,038 | France | Mar. 26, 1945 |
| 918,532 | France | Oct. 28, 1946 |

OTHER REFERENCES

Gamble: Amer. Dyest. Rep., Apr. 14, 1952, p. 226.
Datyner: Man-Made Textiles, May 1956, pp. 63–65.
Rayon and Syn. Text., January 1950, pp. 63, 64V.
Borghetty: Amer. Dyest. Rep., Nov. 29, 1948, pp. 785–786.
Mosher: Amer. Dyest. Rep., Apr. 8, 1946, pp. 171–172.